United States Patent
Hamby et al.

(10) Patent No.: US 9,727,595 B2
(45) Date of Patent: Aug. 8, 2017

(54) LOCATION SEARCHING WITH CATEGORY INDICES

(71) Applicant: Uber Technologies, Inc., San Francisco, CA (US)

(72) Inventors: Brent Hamby, Oakland, CA (US); Zhaolei Song, San Ramon, CA (US)

(73) Assignee: Uber Technologies, Inc., San Francisco, CA (US)

( * ) Notice: Subject to any disclaimer, the term of this patent is extended or adjusted under 35 U.S.C. 154(b) by 259 days.

(21) Appl. No.: 14/033,328

(22) Filed: Sep. 20, 2013

(65) Prior Publication Data
US 2015/0088860 A1    Mar. 26, 2015

(51) Int. Cl.
    *G06F 17/30* (2006.01)
(52) U.S. Cl.
    CPC .... *G06F 17/30321* (2013.01); *G06F 17/3087* (2013.01); *G06F 17/30241* (2013.01)
(58) Field of Classification Search
    CPC .......... G06F 17/3087; G06F 17/30241; G06F 17/30864; G06F 17/30; G06F 17/21; G06F 17/30321; G06F 17/30386; G06F 17/30398; G06F 17/30477; G06F 17/3053; G06F 17/30545; G06F 17/30867; G06F 17/30873
    See application file for complete search history.

(56) References Cited

U.S. PATENT DOCUMENTS

| | | | | |
|---|---|---|---|---|
| 8,166,013 B2 * | 4/2012 | Bandaru | ............ | G06F 17/2745 707/705 |
| 8,204,886 B2 * | 6/2012 | Bickel | ............... | G06F 17/30241 707/741 |
| 8,332,396 B1 * | 12/2012 | Srinivasaiah | .......... | G06Q 30/02 707/723 |
| 8,433,512 B1 * | 4/2013 | Lopatenko et al. | .......... | 701/426 |
| 8,713,004 B1 * | 4/2014 | Hands | ................. | G06F 17/3087 707/724 |
| 8,849,567 B2 * | 9/2014 | Gupta | .................... | G01C 21/32 701/450 |
| 9,194,716 B1 * | 11/2015 | Cutter | ................. | G01C 21/3679 |
| 2006/0123014 A1 * | 6/2006 | Ng | ..................... | G06F 17/30864 |
| 2007/0015119 A1 | 1/2007 | Atenasio | | |
| 2008/0134088 A1 | 6/2008 | Tse et al. | | |

(Continued)

OTHER PUBLICATIONS

PCT International Search Report and Written Opinion, PCT Application No. PCT/IB2014/064359, Dec. 29, 2014, 13 pages.

(Continued)

*Primary Examiner* — Polina Peach
(74) *Attorney, Agent, or Firm* — Fenwick & West LLP

(57) ABSTRACT

A map searching system determines locations responsive to a search query. The map searching system parses the search query to generate a set of search tokens and searches a plurality of location category indices using the search tokens. The location category indicies specify indexes of locations according to various location categories, such as points of interest and cross streets. The resulting records selected from the search tokens are scored based on scoring weights specific to the location category index that a record was selected from. After scoring, a number of high-scoring records are selected as the responsive records to the location search.

19 Claims, 3 Drawing Sheets

(56) References Cited

U.S. PATENT DOCUMENTS

| | | | |
|---|---|---|---|
| 2009/0119268 A1* | 5/2009 | Bandaru | G06F 17/2745 |
| | | | 705/7.12 |
| 2009/0222438 A1* | 9/2009 | Strandell | G06F 17/3087 |
| 2009/0265340 A1* | 10/2009 | Barcklay | G01C 21/3682 |
| 2009/0299853 A1* | 12/2009 | Jones et al. | 705/14.46 |
| 2010/0257162 A1 | 10/2010 | Buron et al. | |
| 2011/0047509 A1* | 2/2011 | Arrasvuori | G01C 21/3673 |
| | | | 715/815 |
| 2011/0137881 A1* | 6/2011 | Cheng et al. | 707/706 |
| 2011/0145228 A1* | 6/2011 | Laurenzo | G01C 21/32 |
| | | | 707/723 |
| 2012/0117112 A1 | 5/2012 | Johnston et al. | |
| 2012/0136849 A1* | 5/2012 | Niranjan et al. | 707/708 |
| 2012/0278339 A1* | 11/2012 | Wang | 707/748 |
| 2012/0304087 A1 | 11/2012 | Walkin et al. | |
| 2012/0310784 A1* | 12/2012 | Bartley | H04L 65/4084 |
| | | | 705/27.1 |
| 2014/0229468 A1* | 8/2014 | Or et al. | 707/724 |
| 2014/0330858 A1* | 11/2014 | Mayhew et al. | 707/769 |
| 2014/0358661 A1* | 12/2014 | Or et al. | 705/14.27 |
| 2015/0052124 A1* | 2/2015 | Pegg | G06F 17/30241 |
| | | | 707/724 |
| 2016/0078037 A1* | 3/2016 | Ziezold | G06F 17/30666 |
| | | | 707/728 |

OTHER PUBLICATIONS

PCT International Preliminary Report on Patentability, PCT Application No. PCT/IB2014/064359, Jan. 11, 2016, 5 pages.

\* cited by examiner

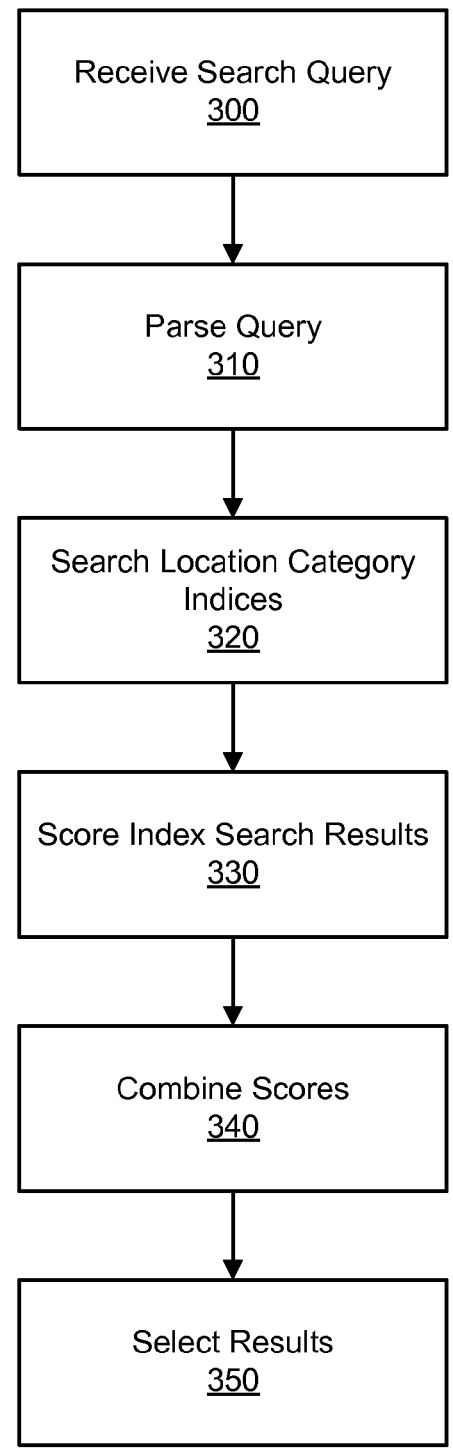

LOCATION SEARCHING WITH CATEGORY INDICES

BACKGROUND

This invention relates generally searching for a location, and particularly to using category indices to improve search results.

Location searching is an important part of mapping and navigation applications and services. Location searching is used to identify a specific location, such as a latitude and longitude, on a map that is associated with the user's search request. Users also typically desire to enter a single string to search for a location, rather than to enter additional information, such as a city, state, type of location, etc. Thus, users enter a single string, such as "empire state" or "castro atm" or "salon near 35 main st" or "main & park." Resolving these search queries into a set of search results for the user is a difficult challenge that frequently creates poor results. In part, this is due to incomplete information provided by the user that often creates ambiguity. For instance, a search for "empire state" in New York partially matches the Empire State Building, organizations named "empire state," and streets that use "empire" in the street name. Accurately selecting from among these ambiguous results to determine a desired result (or a ranking of results) is a difficult problem in location-based searching.

SUMMARY

A map searching system provides location records responsive to a search query. The search query specifies a search string, which is parsed by the map searching system 100 to generate a set of search tokens. The map searching system maintains a set of location category indices. Each location category index stores records having an associated set of fields. After records matching at least one search token from each location category index are selected, the records are scored. The scoring of a record is based on the location category index from which the record was selected. The fields of the record matching the search query are scored using scoring weights associated with the location category index that the record was selected from. This permits the map searching system to search a plurality of indices without merging the indices into a monolithic database or relating each database to one another. In addition, a search may be adjusted using location information from the search query to reduce scores of records that indicate locations further away from the location indicated by the query. In one embodiment, the location information is extracted from the latitude and longitude parameters of the search query.

BRIEF DESCRIPTION OF THE DRAWINGS

FIG. 3 is a flowchart of a method for performing a search based on a set of location category indices according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
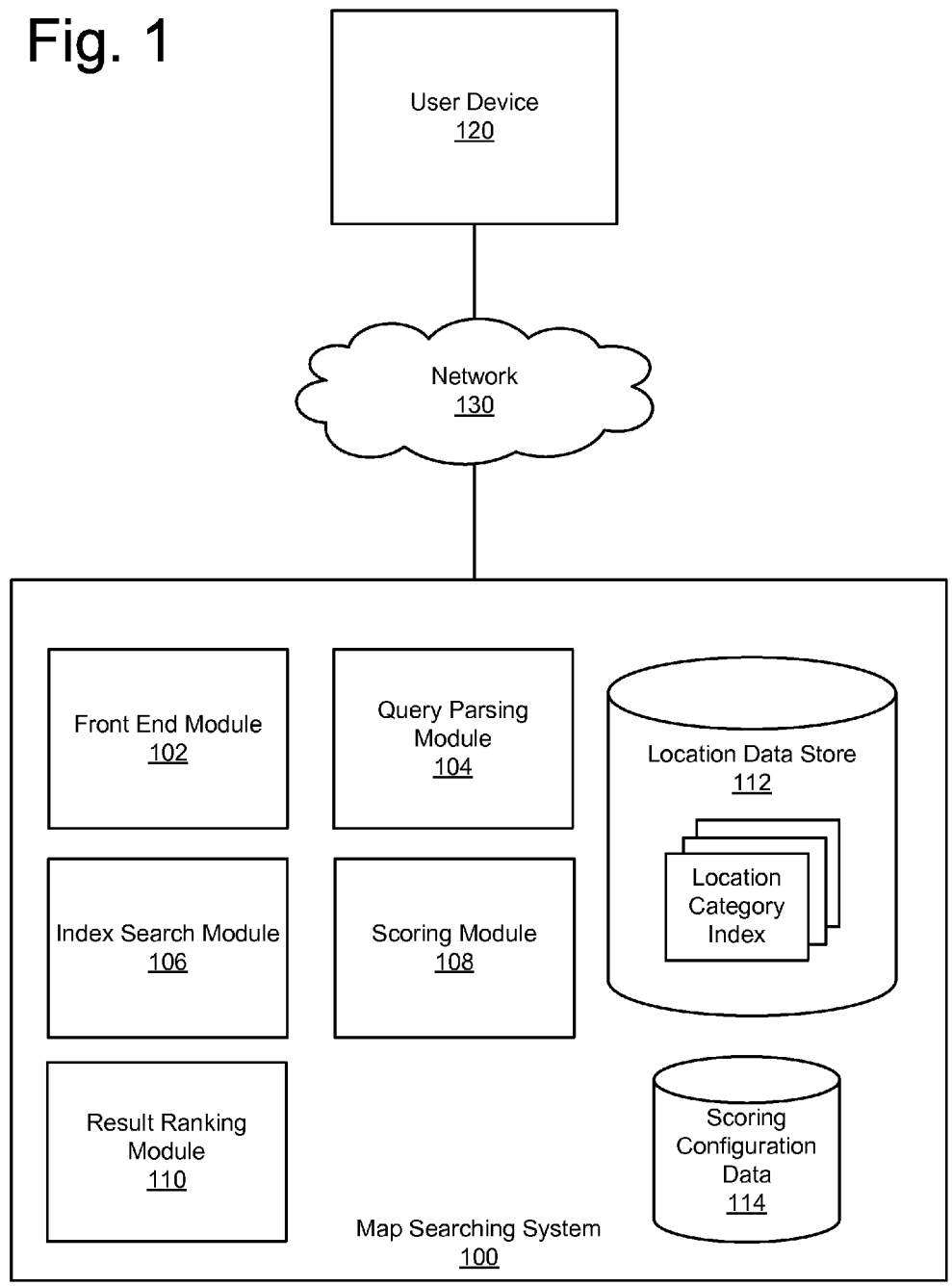
FIG. 1 is an environment for a map searching system according to one embodiment.

FIG. 1 illustrates a map searching system 100 according to one embodiment. The map searching system 100 receives search queries for a location and determines a location or set of locations responsive to the query. In the example shown in FIG. 1, the map searching system 100 communicates with a user device 120 through a network 130, though in other embodiments the map searching system 100 is a part of a larger system, such as a mapping system or a part of a navigation system, and may receive queries and requests through the larger system.

The user device 120 (or other system providing requests to the map searching system 100) provides a query to the map searching system. The user device 120 is any suitable computing system, such as a desktop computer, laptop, handheld computing device (such as a mobile phone or tablet computer), and the like. The user device 120 receives user input, or otherwise generates a search query from an application executing on the user device 120. The search query is typically a string of characters, which may include letters, numbers, spaces, commas, and other textual characters. Accordingly, example queries entered by a user include "45 main street" "pizza" "atm near opera" "50 N 87 St., New York" "John's Electronics" and others. The search query may be entered by any suitable means, such as by text entry or voice recognition. In other embodiments, where the map searching system 100 is a part of a larger system, the query may be generated by the larger system. In one embodiment, the search query includes additional information, such as a type of location searched, geographic information, such as country or city, or additional information regarding a desired location to search.

In one embodiment, the user device 120 also provides location information with the search query. The user device 120 in some embodiments includes a positioning system, such as a global positioning satellite (GPS) receiver, or another means of determining the position of the user device 120, such as by triangulation to local wireless receivers. The location information provided by the search query may be provided from the positioning system, or the user may select a position from which to execute the search. The selected position may be a stored location (such as a saved located for "home"), or a selected geographic location, such as a city. The location information may be used by the map searching system 100 to preference search results close to the location information of the search.

The network 130 provides a pathway for communication between the user device 120 and the map searching system 100. The network 130 is any suitable type of network for communication, which may be wired or wireless, and may pass through intermediary switches and nodes between the user device 120 and map searching system 100.

To determine a location or set of locations responsive to the search from the user, the map searching system 100 executes a search using search tokens generated from the search query. The search tokens are used to select records matching at least one search token from a set of location category indices. The selected records are scored using scoring weights associated with the relevant location category index. The location category indices are stored in a location data store 112 and are typically updated by the operator of the map searching system 100 on a regular basis. Each location category index stores records of locations according to fields associated with each location category index. Each location in a location category index is associated with a specific location, such as a latitude and longitude, or may be associated with a boundary designating the location, such as for a city or country.

In one embodiment, the location category indices include an index for the following types of indices: points of interest (POI), point addresses, address ranges, streets, cross streets, and geography. Each location category index describes a location based on different fields, and one location may be represented in different ways in the several indices according to the fields in that index.

The POI index defines a specific point of interest in each record, such as "John's Pizza" at a specific address. These points of interest generally refer to landmarks, monuments, parks, businesses, government buildings, and the like. Accordingly, the POI index generally includes many fields in the record, such as the name associated with the POI ("John's Pizza"), a category of the POI ("restaurant") a specific street address, a city and state name, and may be linked with significant additional data, such as metadata further describing the POI, such as tags ("Italian"), a rating (3 stars), the menu or reviews of the restaurant. The additional data available may be based on the category of the POI and further databases available to the map searching system 100.

The point address index defines a specific, exact address, such as "85 Main St., Springfield, MA" or "758 Green Ave., Chicago, Ill." The point address index includes fields specifying the point address, such as state, city, street name, and address number. Note that this example and many others in this description use typical U.S.-style addresses, but any acceptable addressing format may be used.

The address range index specifies an address by a range of addresses, such as a minimum and maximum address number associated with a block or portion of a road. For example, an address range record may specify fields relating to "1-500 Remote Rd., Zzyzx, CA." Such fields may include the minimum and maximum address relating to that record, street name, city, and state, for example. Thus, the address range index typically relates to records with a lower specificity than a point address record, but may provide additional records for coverage of areas where point addresses are not known or available.

The street index includes records relating to specific streets, such as "Main St." and may not specify a particular location along Main Street. The street index may include additional information relative to other indexes, for example, indicating specific routes and paths a street may travel, which may not be included in an address range index or point address index entry.

The cross street index includes records relating to specific street crossings, such as the intersection of Main St. with Green St. Thus, a record in the cross street index in one embodiment includes two street names, along with the geographic information (i.e., city and state) where the streets cross.

The geographic index includes records relating more generally to geographic areas, such as a city. A record in the geographic index indicates a geographic area, such as city, country, or state, and may include information regarding the boundaries of the geographic area, such as the locations at which the geographic area begins and ends.

As an example of a location described by various location category indices, consider the location 85 Main St. This location is entered in the POI database as a point of interest record associated with "John's Pizza," but also matches a point address entry and corresponds to an address within a range of 1-100 Main St. Thus, a single location may be described by multiple records in the various location category indices.

While a set of location category indices in one embodiment includes the location category indices described above, other configurations may include more or fewer location category indices, which may describe more or less information in related fields. While the location category indices do not fully overlap in field information, these techniques may be used on location category indices that include duplicative fields, and location category indices that include identical fields with the addition of further fields. In this example, a point of interest record typically includes all of the information in a point address record along with additional information describing the point of interest.

In one embodiment, the location category indices include the same fields, but are associated with different data providers, and therefore may include different sets of records for the same type of category. By maintaining the data from the different data providers separately, the map searching system 100 in this embodiment is more robust against the loss of a source of data, as remaining location category indexes may be used without significant loss of performance. In addition, by maintaining each location category index separately, the operator of the map searching system 100 is not required to merge the various location data from providers into a monolithic database.

After searching the various location category indices to select records that have fields matching at least one search token, the map searching system 100 scores the results to determine which records are most likely relevant to the search, and returns the resulting records to the user device 120 or other requesting system. To perform these functions, the map searching system 100 includes various modules and further data stores.

The map searching system 100 includes a front end module 102 that receives requests to execute a location search from the user device 120. The front end module 102 also transmits the response to the location search to the user device 120. The front end module communicates with the user device 120 according to the protocols used by the user device 120 to access the map searching system 100. For example, the front end module may display a web page to a user of the map searching system, it may present an application programming interface (API) to a program operated on the user device 120, or it may communicate with a proprietary application associated with the map searching system 100, among other configuration options. After receiving the search query, the front end module 102 transfers the search query to a query parsing module 104.

The query parsing module 104 separates the search query to generate a set of search tokens for the query. The query parsing module 104 selects each separate word to be a separate token, though in other embodiments, the query parsing module 104 also selects words that are a part of a phrase, which may be determined based on grammar of the search query or through a dictionary of terms. For example, a grammar may indicate that commas offset an address from a city, and a city from a state, such that a portion of the search query prior to a comma is considered a single token. The query parsing module 104 also determines location information associated with the request. The query parsing module 104 determines the location information based on the type of request. For example a string query search may include location information, and the query parsing module 104 determines that certain strings designate location information, such as "lat=" or "lon=" which are used to determine a latitude and longitude for the location information.

The query parsing module 104 in one embodiment also generates more tokens than there were words in the original search by including the results of multiple parsing methods. For example, "New York" is parsed to generate individual tokens "New" and "York", but a dictionary look-up also generates "New York" as a search token matching a dictionary entry. The generated set of search tokens may thus be all three: "New" "York" and "New York." In addition, the query parsing module 104 in one embodiment accesses a spell checking module or spelling dictionary to determine and correct possible errors in a search query. The original queried word along with the corrected word both generate search tokens in one embodiment. After selection of search tokens, the query parsing module 104 passes the set of search tokens to an index search module 106.

The index search module 106 executes a search against the location category indices in the location data store 112. The index search module 106 searches each location category index using the search tokens to select any records from the location category index that include a field that at least partially matches any search token. These selected records are termed index search results. For each returned record, the index search module 106 receives an associated location category index along with an identification of the fields matched by the record. In the "85 Main St." example, multiple records are selected in the search: one record from the point of interest index indicating an address match (but not a name match), one record from the point address index indicating an address match, and one record from the address range indicating the address is within the range for the record. Partial matches to a field of a record may also be selected, for example, a token for "John's" is treated as a partial match for a point of interest named "John's Pizza." Thus, for a set of search tokens, the index search module 106 selects a set of index search results from each of the location category indices, indicating the records responsive to the search tokens. The index search module 106 passes the index search results to a scoring module 108.

The scoring module 108 scores the index search results to determine the relative weighting of the records obtained by the index search module 106. To determine the scoring, the index search module 106 obtains configuration and instruction information from scoring configuration data 114. For each location category index, each field of the location category index is scored based on the scoring configuration data 114. The scoring configuration data 114 specifies, for each type of location category index, a set of scoring weights for each matching field in a record. Thus, for a point address, the address field may have a higher scoring weight than the scoring weight address field for a point of interest. However, the scoring weights associated with the POI include a scoring weight for fields that are not included in the point address record, such as the name or a matching tag. The scoring configuration data 114 also specifies, in one embodiment, the scoring for partial matches, which may vary by field.

The scoring weights for each field and location category index are selected by the implementer in one embodiment. The weights for a field may be based on the prominent fields relating to a specific location category index. For example, the POI index is particularly related to its naming of points of interest and related metadata, which may be given high scoring weights. In addition, the scoring weights may be based on the reputation of various data providers for the location category indices, or based on contractual fees (e.g., using data from one provider may be more expensive than another). In one embodiment, the scoring weights are adjusted responsive to user feedback, such that the weights are adjusted if users regularly select search results that are not the highest ranked.

For example, a search for the address "85 Main St." matches an address field in a point address record, a point of interest record, and an address range record. Each of these record types has a weight for matching the address field. That is, the same field across multiple indices is configured with a different score weight. In this example, the "address" field in the point address record has a higher weight than the "address" field in the point of interest record, which has a higher weight than the "address" field in the address range record. Accordingly, provided this is the only matching field, the point address record receives a higher score, based on its higher weighting, than the point of interest record, and the point of interest record receives a higher score, based on its weighing, than the address range record score.

In one embodiment, the scoring configuration data 114 may have weighing information for each field of the various location category indices. For example, "address" field in point address index has higher weight than "address" field in address range index. It may also includes some field boost and record boost information. To implement the ordering, the scoring module 108 calculates the score of each record based on scoring configuration data 114.

The scoring module 108 in one embodiment also generates a distance score for each resulting record. The distance score is determined based on the location of the object identified by the record and the location information for the query. The closer the locations are to each other, the higher the distance score will be. For records that have similar scores exclusive of the distance score, the distance score differentiates these records to preference closer results.

After generating scores for each field of a record and the distance score, scoring module 108 combines the scores. In one embodiment, the combined score is a summation of the score for each field of a record and the distance score. It may combine other scores like popularity score from review rankings.

Using the combined scores, a result ranking module 110 ranks the scored records and selects a set of search results from the index search results based on the ranked records. The set of search results is returned to the user device 120 through the network 130.

Figure 2:
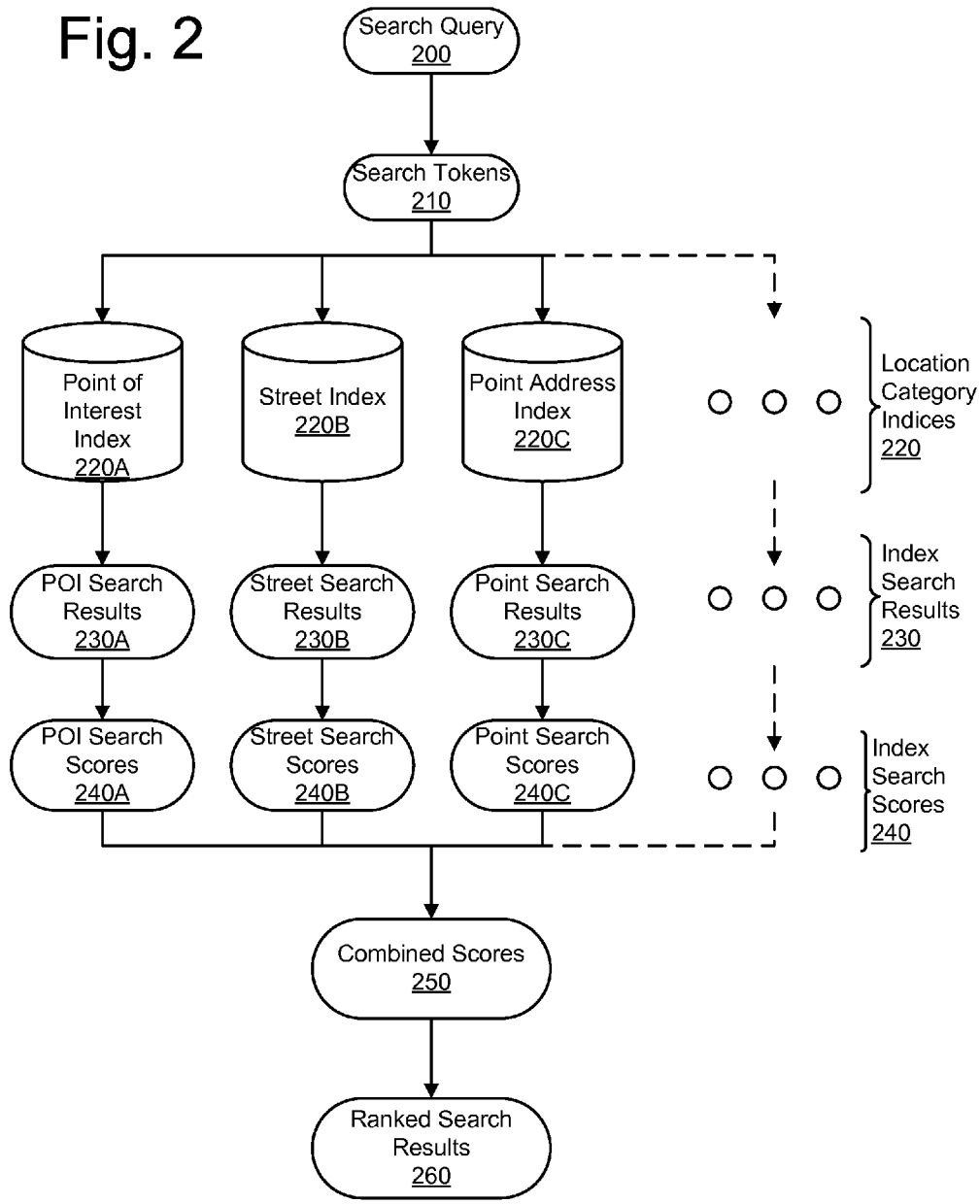
FIG. 2 illustrates a data processing flow according to one embodiment.

FIG. 2 illustrates a data processing flow according to one embodiment. A search query 200 is parsed by the query parsing module 104 to generate a set of search tokens 210. The search tokens are used to search a set of location category indices 220 by index search module 106 and to select sets of index search results 230. Specifically, in this example, the search tokens search a point of interest (POI) index 220A to select POI search results 230A. A separate search is performed to street index 220B to select street search results 230B, and a third search is performed to point address index 220C to select point search results 230. As shown, any number of additional or fewer location category indices may be searched.

Using the index search results 230, the records obtained from the location category indices are scored by scoring module 108 based on scoring weights specific to each location category index 220. Though shown here as creating separate scores for each set of index search results 230, such as POI search scores 240A, street search scores 240B, and point search scores 240C, in one embodiment the scores are not separately stored. Each index search score 240 may also include a distance score based on the distance between the object in a record and location information from the search query as described above. All of the scored records from different indexes are grouped to 250. Finally the results are ranked using the combined scores and a set of search results are selected as the search results 260. For example, the selected results may be a maximum number of highest-scoring records or the records over a threshold score.

FIG. 3 is a flowchart of a method for performing a search using a set of location category indices according to one embodiment. This method is performed in one embodiment by the map searching system 100, such as by the modules described above with respect to FIG. 1. The map searching system receives 300 a search query from a user device 120 or from another map-based system. The search query is parsed 310 to generate a set of search tokens for searching a plurality of location category indices to obtain search results associated with each index. The search results are scored 330 based on scoring weights associated with each type of location category index and the distance of the search results from the location information. The scores are combined 340 to generate a combined score for each record. From the combined scores, a set of search results is selected 350, which are transmitted to the requesting entity.

In one embodiment, the location information for the distance used in scoring is derived from the search query using a designated keyword, such as "near." In this embodiment, the search query is parsed to generate tokens, and tokens after "near" are treated as specifying location information. For example, "ATM near 85 main st" is resolved to search for tokens generated from "ATM" based on location information determined by tokens generated from "85 main st." To select a location for the location information relating to "85 main st.," two searches are performed, first to identify a location related to "85 main st." and second to identify "ATM" near that location. This enables broad conjunctive searches using the separate portions of a search query. This enables a search combining various ways to describe a location, such as a search for "John's Pizza near Main & Green." After parsing, "Main & Green" is separated from "John's Pizza" and "Main & Green" is used to generate search tokens for a first search to determine location information for a second search. The second search is performed using "John's Pizza" as a search query, and the results are adjusted based on a distance from the results for "Main & Green."

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for selecting a location responsive to a location search query, the method comprising:
   receiving, by one or more processors, a location search query comprising a textual string;
   parsing, by the one or more processors, the textual string to generate a set of search tokens;
   identifying a first location category index describing locations using a first plurality of fields;
   identifying a second location category index describing locations using a second plurality of fields including at least a common field with the first plurality of fields and a different field than the first plurality of fields;
   searching, by the one or more processors, the first location category index to select a first set of index search results by identifying locations in the first location category index that have one or more fields of the first plurality of fields at least partially matching a search token in the set of search tokens;
   identifying a first set of scoring weights designating a weight for each field in the first plurality of fields of the first location category index;
   scoring each index search result in the first set of index search results by scoring each field of the first plurality of fields that at least partially matches a search token in the set of search tokens according to the scoring weight for that field of the first set of scoring weights;

searching, by the one or more processors, the second location category index to select a second set of index search results by identifying locations in the second location category index that have one or more fields of the second plurality of fields at least partially matching a search token in the set of search tokens;

identifying a second set of scoring weights designating a weight for each field in the second plurality of fields of the second location category index, the common field designated with different weights by the first and second sets of scoring weights, the weights of the common field determined based on a relative importance of the common field to the respective location category index;

scoring each index search result in the second set of index search results by scoring each field of the second plurality of fields that at least partially matches a search token in the set of search tokens according to the scoring weight for that field of the second set of scoring weights; and selecting, for the location, an index search result of the first set of index search results or the second set of index search results based on the scoring of the first set of index search results and the scoring of the second set of index search results.

2. The method of claim 1, wherein the scoring for each index search result in the first set of index search results includes a distance score using a distance of the index search result from a determined location, and wherein the scoring excludes index search results that exceed a threshold distance from the determined location.

3. The method of claim 1, wherein the first and second sets of scoring weights are further determined based on reputations of a first and second provider of the first and second location category indices, respectively.

4. The method of claim 3, wherein the first provider is different than the second provider.

5. The method of claim 1, wherein the first category location index describes one or more of: points of interest, point addresses, address ranges, streets, cross streets, and geographies.

6. A computer program product for selecting a location responsive to a location search query, the computer program product comprising a non-transitory computer-readable storage medium containing computer program code for:

receiving, by one or more processors, a location search query comprising a textual string;

parsing, by the one or more processors, the textual string to generate a set of search tokens;

identifying a first location category index describing locations using a first plurality of fields;

identifying a second location category index describing locations using a second plurality of fields including at least a common field with the first plurality of fields and a different field than the first plurality of fields;

searching, by the one or more processors, the first location category index to select a first set of index search results by identifying locations in the first location category index that have one or more fields of the first plurality of fields at least partially matching a search token in the set of search tokens;

identifying a first set of scoring weights designating a weight for each field in the first plurality of fields of the first location category index;

scoring each index search result in the first set of index search results by scoring each field of the first plurality of fields that at least partially matches a search token in the set of search tokens according to the scoring weight for that field of the first set of scoring weights;

searching, by the one or more processors, the second location category index to select a second set of index search results by identifying locations in the second location category index that have one or more fields of the second plurality of fields at least partially matching a search token in the set of search tokens;

identifying a second set of scoring weights designating a weight for each field in the second plurality of fields of the second location category index, the common field designated with different weights by the first and second sets of scoring weights, the weights of the common field determined based on a relative importance of the common field to the respective location category index;

scoring each index search result in the second set of index search results by scoring each field of the second plurality of fields that at least partially matches a search token in the set of search tokens according to the scoring weight for that field of the second set of scoring weights; and selecting, for the location, an index search result of the first set of index search results or the second set of index search results based on the scoring of the first set of index search results and the scoring of the second set of index search results.

7. The computer program product of claim 6, wherein the scoring for each index search result in the first set of index search results includes a distance score using a distance of the index search result from a determined location, and wherein the scoring excludes index search results that exceed a threshold distance from the determined location.

8. The computer program product of claim 6, wherein the first and second sets of scoring weights are further determined based on reputations of a first and second provider of the first and second location category indices, respectively.

9. The computer program product of claim 8, wherein the first provider is different than the second provider.

10. The computer program product of claim 6, wherein the first category location index describes one or more of: points of interest, point addresses, address ranges, streets, cross streets, geographies.

11. A system for selecting a location responsive to a location search query, comprising:

one or more processors configured for executing instructions; and a non-transitory computer-readable storage medium, storing instructions that when executed by the one or more processors cause the one or more processors to:

receive a location search query comprising a textual string;

parse the textual string to generate a set of search tokens;

identify a first location category index describing locations using a first plurality of fields;

identify a second location category index describing locations using a second plurality of fields including at least a common field with the first plurality of fields and a different field than the first plurality of fields;

search, by the one or more processors, the first location category index to select a first set of index search results by identifying locations in the first location category index that have one or more fields of the first plurality of fields at least partially matching a search token in the set of search tokens;

identify a first set of scoring weights designating a weight for each field in the first plurality of fields of the first location category index;

score each index search result in the first set of index search results by scoring each field of the first plurality of fields that at least partially matches a search token in the set of search tokens according to the scoring weight for that field of the first set of scoring weights;

search, by the one or more processors, the second location category index to select a second set of index search results by identifying locations in the second location category index that have one or more fields of the second plurality of fields at least partially matching a search token in the set of search tokens;

identify a second set of scoring weights designating a weight for each field in the second plurality of fields of the second location category index, the common field designated with different weights by the first and second sets of scoring weights, the weights of the common field determined based on a relative importance of the common field to the respective location category index;

score each index search result in the second set of index search results by scoring each field of the second plurality of fields that at least partially matches a search token in the set of search tokens according to the scoring weight for that field of the second set of scoring weights; and select, for the location, an index search result of the first set of index search results or the second set of index search results based on the scoring of the first set of index search results and the scoring of the second set of index search results.

12. The system of claim 11, wherein the scoring for each index search result in the first set of index search results includes a distance score using a distance of the index search result from a determined location, and wherein the scoring excludes index search results that exceed a threshold distance from the determined location.

13. The system of claim 11, wherein the first and second sets of scoring weights are further determined based on reputations of a first and second provider of the first and second location category indices, respectively.

14. The system of claim 13, wherein the first provider is different than the second provider.

15. The system of claim 11, wherein the first category location index describes one or more of: points of interest, point addresses, address ranges, streets, cross streets, and geographies.

16. The method of claim 1, wherein at least one location is described by the first location category index and by the second location category index.

17. The computer program product of claim 6, wherein at least one location is described by the first location category index and by the second location category index.

18. The method of claim 1, wherein the second weight is greater than the first weight based on user feedback indicating that index search results from the second set of index search results are selected more frequently than index search results from the first set of index search results.

19. The computer program product of claim 6, wherein the second weight is greater than the first weight based on user feedback indicating that index search results from the second set of index search results are selected more frequently than index search results from the first set of index search results.

* * * * *